(12) United States Patent
Lee

(10) Patent No.: US 9,451,456 B2
(45) Date of Patent: Sep. 20, 2016

(54) SMART PHONE SERVER SLEEVE

(71) Applicant: The Aerospace Corporation, El Segundo, CA (US)

(72) Inventor: Richard M Lee, Calabasas, CA (US)

(73) Assignee: The Aerospace Corporation, El Segundo, CA (US)

( * ) Notice: Subject to any disclaimer, the term of this patent is extended or adjusted under 35 U.S.C. 154(b) by 260 days.

(21) Appl. No.: 13/908,919

(22) Filed: Jun. 3, 2013

(65) Prior Publication Data

US 2014/0357227 A1  Dec. 4, 2014

(51) Int. Cl.
*H04W 12/06* (2009.01)
*H04L 29/06* (2006.01)
*H04W 84/18* (2009.01)
*H04W 52/02* (2009.01)

(52) U.S. Cl.
CPC .......... *H04W 12/06* (2013.01); *H04L 63/0876* (2013.01); *H04W 52/0296* (2013.01); *H04W 84/18* (2013.01)

(58) Field of Classification Search
CPC .. H04M 1/04; H04M 1/7253; H04M 1/0254; H04M 1/72527; H04L 9/32; H04L 29/06; H04L 9/3234; H04L 2209/127; G06F 21/577; G06F 9/45533; G06F 21/57; G06F 21/31; G06F 21/575; H04W 12/06; H04W 12/10
See application file for complete search history.

(56) References Cited

U.S. PATENT DOCUMENTS

| | | | |
|---|---|---|---|
| 5,619,395 | A | 4/1997 | Mcbride |
| 7,494,239 | B2 | 2/2009 | Riccardi |
| 8,060,560 | B2 | 11/2011 | Vonog et al. |
| 8,831,698 | B1* | 9/2014 | Paulis et al. ............... 455/575.8 |
| 2004/0097277 | A1 | 5/2004 | Shimamura |
| 2007/0167190 | A1* | 7/2007 | Moosavi et al. ............. 455/557 |
| 2008/0046581 | A1* | 2/2008 | Molina et al. ............... 709/229 |
| 2008/0169351 | A1 | 7/2008 | Whiting |
| 2008/0232089 | A1 | 9/2008 | Riccardi |
| 2009/0132816 | A1 | 5/2009 | Lee |
| 2009/0319782 | A1 | 12/2009 | Lee |
| 2010/0042671 | A1* | 2/2010 | Natt ....................... H04M 1/06 709/203 |
| 2010/0122184 | A1 | 5/2010 | Vonog et al. |
| 2010/0138751 | A1 | 6/2010 | Kumar et al. |
| 2011/0093567 | A1 | 4/2011 | Jeon et al. |
| 2012/0021731 | A1 | 1/2012 | Lam |
| 2012/0054843 | A1* | 3/2012 | Horman .................. G06F 21/31 726/7 |
| 2012/0084154 | A1 | 4/2012 | Dresner |
| 2012/0084665 | A1 | 4/2012 | Bookstaff |
| 2012/0203733 | A1 | 8/2012 | Zhang |
| 2012/0254479 | A1 | 10/2012 | Matsuoka |

FOREIGN PATENT DOCUMENTS

WO    2009064406 A    5/2009

OTHER PUBLICATIONS

Antonio Celesti et al., "Virtual Machine Provisioning Through Satellite Communications in Federated Cloud Environments," Jun. 12, 2011.

(Continued)

*Primary Examiner* — Nam Huynh

(74) *Attorney, Agent, or Firm* — LeonardPatel PC

(57) ABSTRACT

A sleeve that acts as a server is provided. In one embodiment, the sleeve may be configured to attach to a mobile device. The sleeve may include a server configured to wirelessly connect to the mobile device.

25 Claims, 7 Drawing Sheets

(56) References Cited

OTHER PUBLICATIONS

AzoOptics, "Novel Attachment Uses Cell Phone's Built-in Camera to Test Food Allergens," Dec. 13, 2012, http://www.azooptics.com/News.aspx?newsID=16573.

Byung-Gon Chun et al., "Augmented Smartphone Applications Through Clone Cloud Execution," published in HotOS in 2009.

Byung-Gon Chun et al., "CloneCloud: Elastic Execution between Mobile Device and Cloud," Presented at Eurosys '11 during Apr. 10-13, 2011 in Salzburg, Austria.

Cisco, "Infrastructure as a Service: Accelerating Time to Profitable New Revenue Streams," last access date: May 29, 2013, http://www.cisco.com/en/US/solutions/collateral/ns341/ns991/ns995/1aaS_BDM_WP.pdf.

David Goldman, "Apple iPod Dilemma," Jul. 29, 2011, http://money.cnn.conn/2011/07/29/technology/apple_ipod_sales/index.htm.

FreedomPop, "Freedom Sleeve Rocket—4G Hotspot for iPod Touch," Dec. 21, 2012, http://www.freedompop.com/devices/freedom-sleeve-rocket-ipod-touch.

Jacob Lopez, "Turns iPod Touch into an iPhone," dated Jul. 31, 2012, http://www.informationweek.com/byte/personal-tech/smartphones/4g-case-turns-ipod-touch-into-an-iphone/240004625.

Lei Xia et al., "Virtual WiFi: Bring Virtualization from Wired to Wireless," Presented at VEE '11 during Mar. 9-11, 2011 in Newport Beach, California, USA.

Market Research Media, "U.S. Federal Cloud Computing Market Forecast 2013-2018," Apr. 12, 2013, http://www.marketresearchmedia.com/?p=145.

Mike Halsey, "zInstall Launch New Type-0 Hypervisor," Sep. 22, 2011, http://www.ghacks.net/2011/09/22/zinstall-launch-new-type-0-hypervisor/.

Nvidia, The Benefits of Multiple CPU Cores in Mobile Devices, 23, http://www.nvidia.com/content/PDF/tegra_{white}_papers/Benefits-of-Multi-core-CPUs-in-Mobile-Devices_Ver1.2.pdf.

Philips, "Attachable Battery Pack for Mobile Phone," http://www.usa.philips.com/c/cell-phone-accessories/chargeon-for-mobile-phone-dlp2272_17/prd.

Tim Schiesser, Guide to Smartphone Hardware Processor, Feb. 12, 2012, 38, http://www.neowin.net/news/guide-to-smartphone-hardware-17-processors.

\* cited by examiner

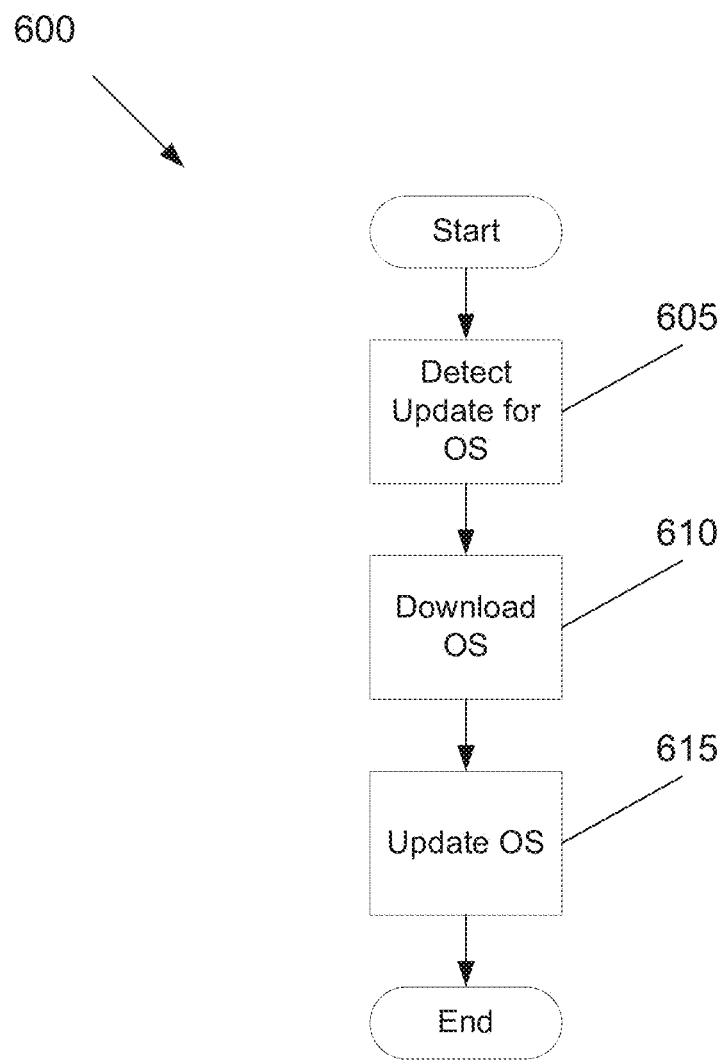

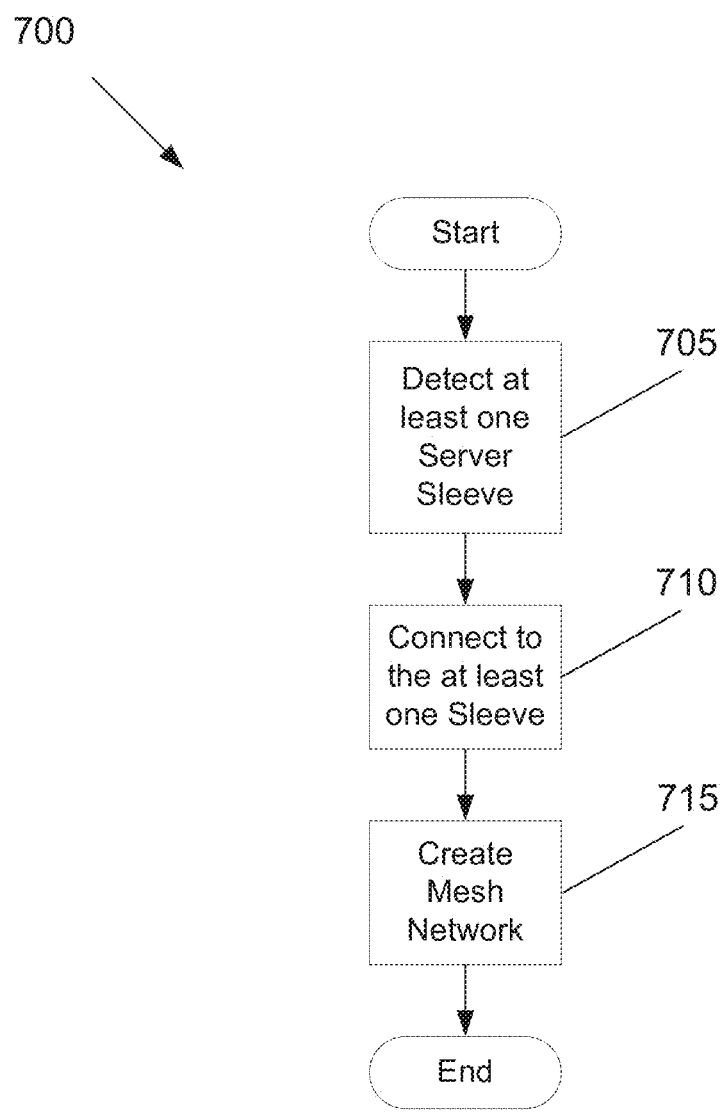

SMART PHONE SERVER SLEEVE

FIELD

The present invention relates to a sleeve and, more particularly, to a sleeve that may operate as a server when near, or attached to, a mobile device.

BACKGROUND

Generally, mobile devices, such as an iPhone®, iPad®, or any other portable device, may be attached to a sleeve (or protective case). These sleeves may provide various types of functionality. For example, the sleeve may help to prevent damage to the mobile device when a user drops his or her mobile device. Some sleeves, for example, provide additional battery power for the mobile device. This may extend the period of usage of the mobile device between charges.

However, other than extending battery power and protecting the mobile device, the sleeve fails to provide extra computational power. Thus, a sleeve that includes a server configured to provide a trusted, secure environment may be beneficial to the user, as most mobile devices are limited in terms of root-of-trust, computational power, memory, battery power, etc.

SUMMARY

Certain embodiments of the present invention may provide solutions to the problems and needs in the art that have not yet been fully identified, appreciated, or solved by current mobile device sleeves. For example, the embodiments described herein pertain to a mobile device sleeve that includes a server configured to provide a trusted, secure environment, and a root-of-trust as a basis for remote attestation.

In accordance with an embodiment of the present invention, an apparatus is provided. The apparatus includes a sleeve configured to attach to a mobile device. The sleeve includes a server configured to wirelessly connect to, and provide a secure and trusted environment for, the mobile device.

In another embodiment of the present invention, an apparatus is provided. The apparatus includes a sleeve. The sleeve includes a server configured to connect to a mobile device. The sleeve also includes a crypto-unit configured to authenticate hardware components and software components of the mobile device. The sleeve may be configured to attach to the mobile device.

In yet another embodiment of the present invention, a sleeve for a mobile device is provided. The sleeve includes memory and at least one multi-core processor configured to create a server that is configured to provide a secure, trusted environment for a mobile device. The sleeve is configured to physically attach to the mobile device.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 6 is a flow diagram illustrating a process for updating one or more operating systems on a server sleeve, according to an embodiment of the present invention.

FIG. 7 is a flow diagram illustrating a process for creating a mesh network, according to an embodiment of the present invention.

DETAILED DESCRIPTION OF THE EMBODIMENTS

Embodiments described herein pertain to a sleeve for a mobile device. The sleeve may include memory and at least one processor configured to create a server. The server may provide a trusted, secure environment for a mobile device.

Figure 1:
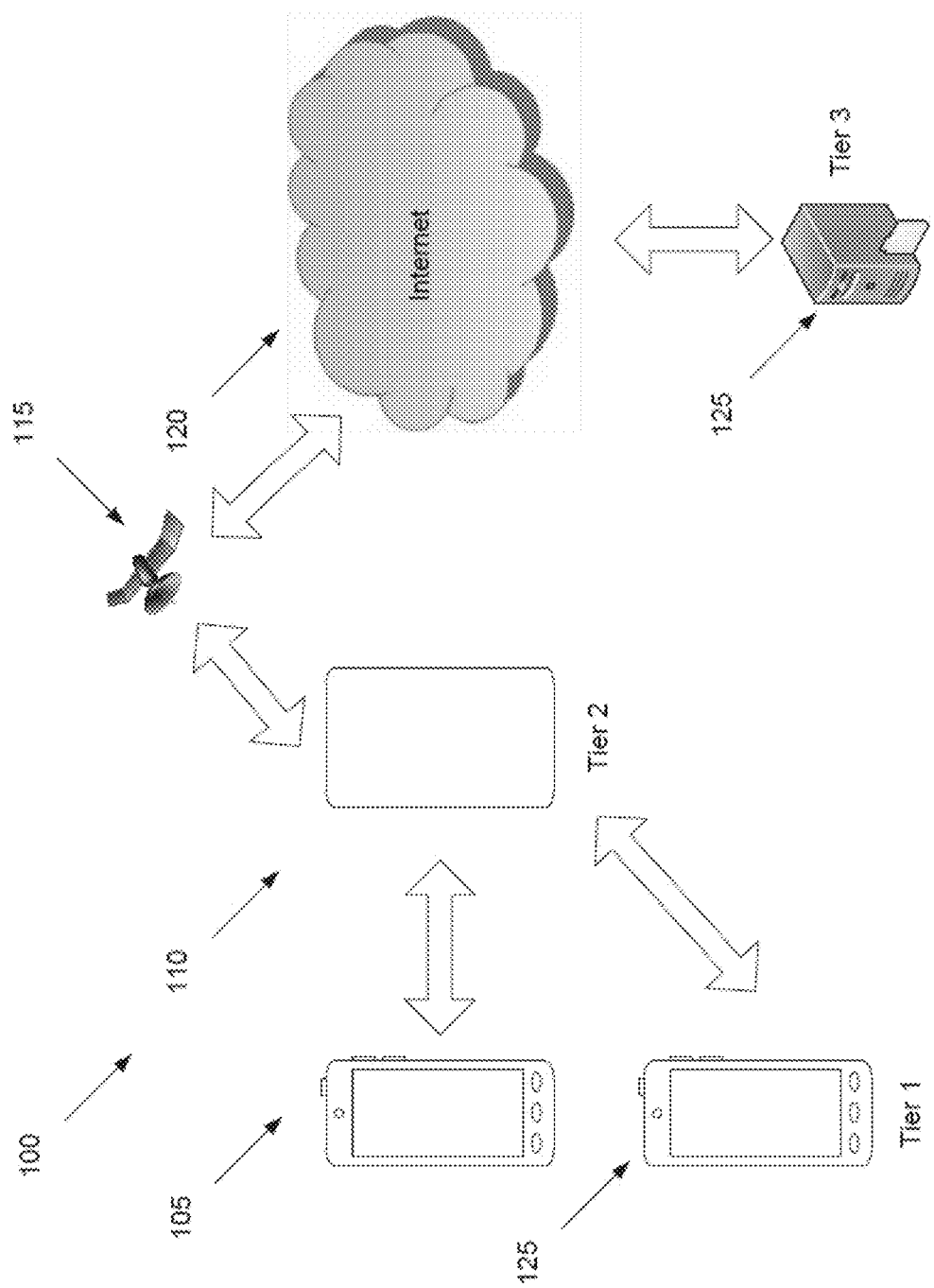
FIG. 1 illustrates a three-tier architecture for a server sleeve, according to an embodiment of the present invention.

FIG. 1 illustrates three-tier architecture 100 for a server sleeve, according to an embodiment of the present invention. In this embodiment, a mobile device 105, such as a mobile phone, personal digital assistant (PDA), etc., may attach to a sleeve 110. In this embodiment, mobile device 105 may be attached to, or located near, server sleeve 110. Server sleeve 110 may act as a middle tier server that connects to Internet 120 via satellite 115, providing mobile device 105 with a connection to a traditional server 125. Stated differently, server sleeve 110 may act as a mini server for mobile device 105, as well as a WIFI hotspot for other mobile devices 125.

Figure 2:
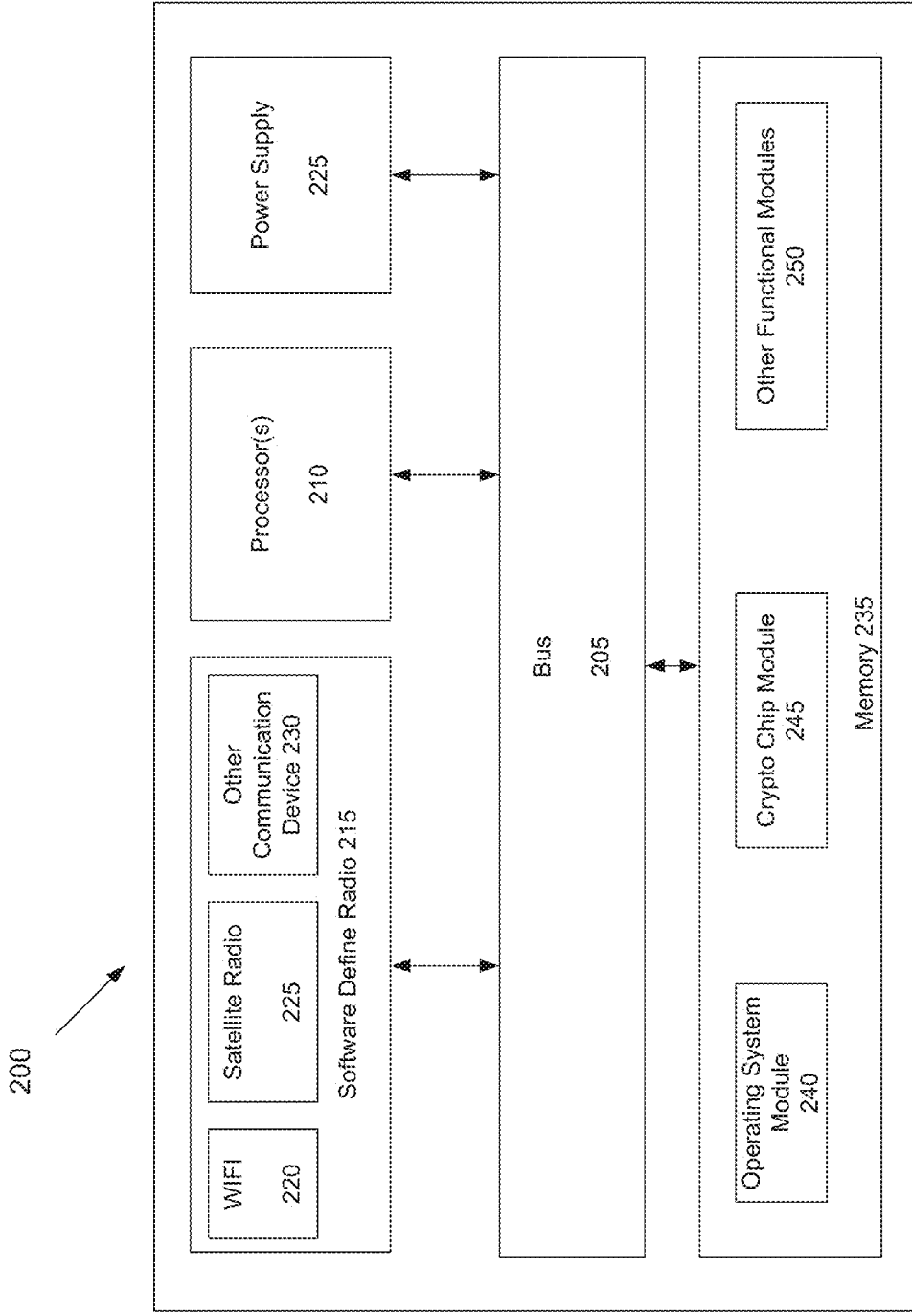
FIG. 2 illustrates a server sleeve, according to an embodiment of the present invention.

FIG. 2 illustrates a sleeve 200, according to an embodiment of the present invention. Sleeve 200 may be configured to act as a server. Sleeve (hereinafter "server sleeve") 200 may include a bus 205 or other communication mechanism that can communicate information and at least one processor 210, coupled to bus 205, to process information. At least one processor 210 can be any type of general or specific purpose processor, e.g., a multi-core processor. Server sleeve 200 may also include memory 235 that can store information and instructions to be executed by at least one processor 210. Memory 235 can be comprised of any combination of random access memory ("RAM"), read only memory ("ROM"), static storage such as a magnetic or optical disk, or any other type of computer readable medium, such as a wired or wireless network and storage to enable cloud computing and virtualization.

The computer readable medium may be any available media that can be accessed by at least one processor 210. The computer readable medium may include both volatile and nonvolatile medium, removable and non-removable media, and communication media. The communication media may include computer readable instructions, data structures, program modules, or other data and may include any information delivery media.

According to one embodiment, memory 235 may store software modules that may provide functionality when executed by at least one processor 210. The modules can include an operating system module 240 and a crypto chip module 245, as well as other functional modules 250. Operating system module 240 may provide operating system functionality for server sleeve 200. Because the server sleeve 200 may be part of a larger system, server sleeve 200 may include one or more additional functional modules 250 to include the additional functionality. For example, memory 235 may store virtual machine managers, host operating system, guest operating systems, applications, etc., to support cloud computing and virtualization. In certain embodiments, server sleeve 200 may include a universal serial bus (USB) interface to connect with a USB device. This allows mobile devices not having a USB interface to connect with a USB device via server sleeve 200.

It should be appreciated that server sleeve 200 may be a trusted, secure server. To provide a trusted and secure environment, an image of the mobile device is stored in memory 235 of server sleeve 200. The image may be of hardware and/or software of the mobile device. This may allow crypto chip module 245 to validate the mobile device prior to granting access to server sleeve 200.

In certain embodiments, to authenticate the mobile device, crypto chip module 245 may store measurements of the mobile device to measure a mobile device prior to connecting the mobile device to server sleeve 200. The authentication may be performed through remote attestation. This allows server sleeve 200 to determine whether the mobile device is a trusted device, and, if so, allows the mobile device to connect to server sleeve 200.

Crypto chip module 245 may include a hardware crypto unit and a software crypto unit. The hardware crypto unit may authenticate hardware components of the mobile device, and the software crypto unit may authenticate the software components of the mobile device.

Server sleeve 200 may also include a software define radio (SDR) 215, to provide server sleeve 200 with continuous communication with the Internet. In this embodiment, SDR 215 may include a satellite radio 225 configured to allow the mobile device to be continuously connected to the Internet via sleeve 200 even if the mobile device has no signal. This provides the user with the presumption that he or she is connected to the cloud. Server sleeve 200 may also include WIFI 220 configured to connect to, and exchange data with, other server sleeves (and/or remote servers) to form a mesh network. Mesh networks and mobile ad hoc networking (MANET) exhibit a desirable self-healing capability allowing a routing based network to continue to operate even if a node (e.g., server sleeve) goes down or a connection goes bad. As a result, the mesh network provides a reliable connection, and is resilient to failures due to the multi-path connections between a source and a destination in the network. It should be appreciated that nodes may join and leave transparently to the end user. This is particularly desirable in ubiquitous cloud computing environment that the embodiments are envisioned to enable through the very popularity of mobile devices.

Because server sleeve 200 utilizes SDR 215, server sleeve 200 has the capabilities to be connected with a network. Stated differently, this enables constant communications switching between protocols or frequencies such that calls are never dropped due to a bad or broken connection.

Because the server sleeve 200 includes WIFI 220 and may be in constant communication with the Internet, server sleeve 200 may act as a WIFI hot spot, allowing other mobile devices in proximity to server sleeve 200 to connect to the Internet via server sleeve 200. For instance, when another mobile device not attached to sleeve 200 attempts to connect to the Internet via server sleeve 200, an application hosted on server sleeve 200 may request payment. This allows a user of the mobile device, or server sleeve 200, to offset monthly costs associated with the mobile device and/or server.

Furthermore, in some embodiments, the hot spot allows under-utilized resources in server sleeve 200 to be rented out on-demand to other mobile users and their devices to offset monthly expenditures and to better utilize available resources. Moreover, in certain embodiments, server sleeve 200 may allow a service provider (e.g., Verizon®, AT&T®, etc.) to utilize unused resources, such that other mobile devices not attached to server sleeve 200 to access the unused resources of server sleeve 200. For example, the service provider may install a virtual machine to memory 235 of sleeve for distribution and/or use by other mobile devices. This allows other devices to utilize the virtual machine without impacting the user experience of the owner of server sleeve 200.

In certain embodiments, server sleeve 200 may download to memory 235 an encrypted virtual machine having, for example, a movie and a player that can be played on an authenticated mobile device. As discussed above, the crypto chip may authenticate the mobile device. Once the mobile device is authenticated, the encrypted virtual machine may be decrypted, allowing the remote device to access the movie via the player. The encryption and decryption process may be carried out by crypto chip module 245. Crypto chip module 245 may include a hardware encryption unit and a software encryption unit.

As discussed above, server sleeve 200 may include at least one host operating system. Because server sleeve 200 may have constant communication with the Internet, when an update is required for the host operating system, server sleeve 200 can automatically download the update and apply the update to the host operating system. This allows the user of the mobile device to experience an updated host operating system without having to manually update the operating system. For example, when a user of the mobile device connects to server sleeve 200, the user will experience the updated host operating system.

Stated differently, server sleeve 200 may perform the update regardless of the whether the mobile device is activated or connected to server sleeve 200. The only requirement would be to have server sleeve 200 turned on. Further, as long as server sleeve 200 is activated, other authorized mobile devices may sync with server sleeve 200. For example, if the user owns an iPad®, the user may be able to sync data from the iPad® to server sleeve 200 regardless of whether the remote device (e.g., an iPhone®) is connected to server sleeve 200.

In some embodiments, even if server sleeve 200 does not have connection to a wireless network or the Internet, the mobile device, as well as other authenticated mobile devices of the user, may sync data with server sleeve 200. Services, such as, continuous auto-sync, may be enabled by resources on server sleeve 200 to free up resources on the mobile device to enrich the user experience. Server sleeve 200 may also act as an intermediary storage device allowing the mobile device to sync with server sleeve 200, creating the illusion that the mobile device has synced with a backend server even though no network connection currently exists. This prevents the user from experiencing a communication failure between the mobile device and server sleeve 200 even if server sleeve 200 is not connected to a network. It should be noted that once server sleeve 200 has established communication with a more traditional server 125 as shown in FIG. 1, server sleeve 200 may then sync (or translate) the data stored in memory 235.

Further, server sleeve 200 may transparently sync the data from the mobile device to the backend server (see traditional server 125 in FIG. 1) when a network connection has been established. Furthermore, security can be commoditized as part of the server sleeve 200 infrastructure service without imposing a hardware refresh of the mobile device or traditional server 125 as shown in FIG. 1, and without impeding the user experience.

It should be appreciated that memory 235 of server sleeve 200 may store multiple operating systems, such as an Android® operating system, Mac® operating system, Windows®-based operating system, or any operating system that would be appreciated by a person of ordinary skill in the art. This allows a user of the mobile device, when connected to server sleeve 200, to experience any operating system that he or she desires regardless of the operating system running on the mobile device.

Server sleeve 200 may also include guest operating systems to allow other remote mobile devices (e.g., guest mobile devices) other than the mobile device of the user to access the guest operating system. For example, depending on the security permission of the guest mobile device, the user of the guest mobile device, when authenticated, may access a guest operating system via server sleeve 200. This allows guest users to access server sleeve 200 in a secure manner. Server sleeve 200 may also be configured to erase history of the guest user when the guest mobile device disconnects with server sleeve 200.

In certain embodiments, server sleeve 200 may also include a display panel (not shown), such as a liquid crystal display, to allow a user of a mobile device to view applications running on server sleeve 200. This may be particularly beneficial for users that do not have smart phones. When the user of the mobile device connects, either physically or wirelessly, with server sleeve 200, crypto chip module 245 may authenticate the hardware and software (including firmware) of the mobile device. Once the mobile device is authenticated, a virtual machine manager may execute an operating system stored in memory 235, allowing the user of the mobile device to view content via the display.

In certain embodiments and, in particular, embodiments that include the display panel, the server sleeve 200 may include a graphics card. The graphics card may include a field-programmable gate array (FPGA) card, or a graphical processing unit (GPU), to increase the graphics capability of the mobile device that connects to server sleeve 200.

Server sleeve 200 may also include a power supply 225. Power supply 225 may be a rechargeable power supply. In certain embodiments, a solar array (not shown) may be included on server sleeve 200 to recharge power supply 225. Power supply 225, in some embodiments, may also supply power to the mobile device when physically connected to sleeve 200. In other embodiments, power supply 225 may receive power from the mobile device when physically connected to server sleeve 200.

It should be noted that some of server sleeve 200 features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 3:
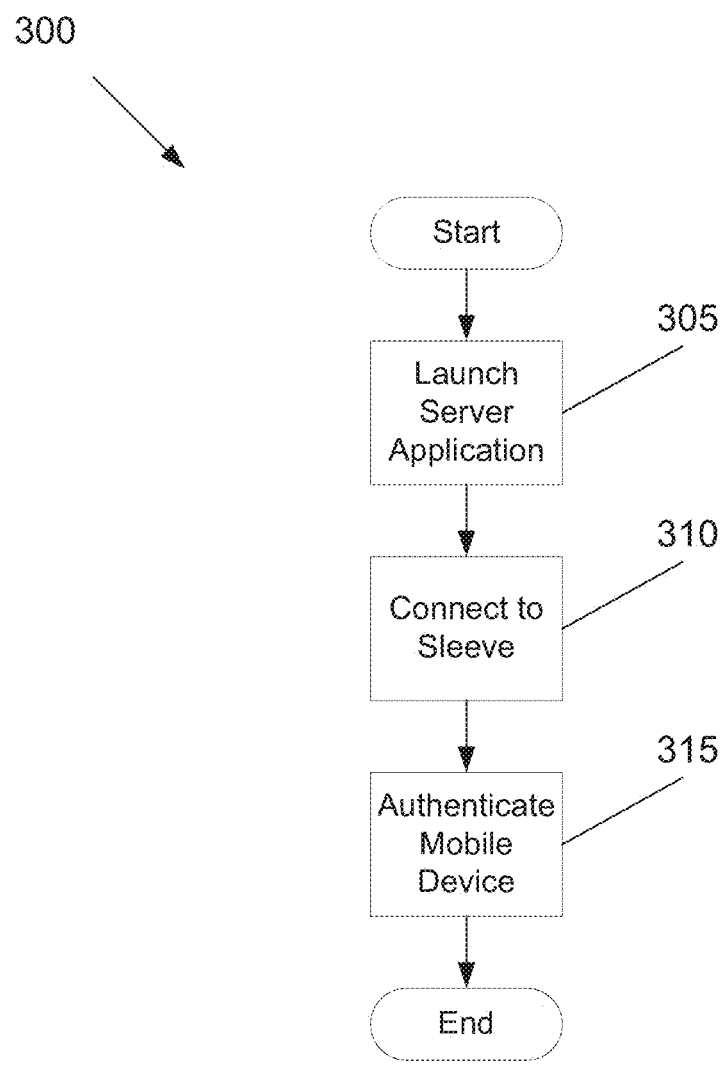
FIG. 3 is a flow diagram illustrating a process for connecting to a server sleeve, according to an embodiment of the present invention.

FIG. 3 is a flow diagram 300 illustrating a process for connecting to a server sleeve, according to an embodiment of the present invention. In this embodiment, the process begins with a user selecting and launching at 305 a server sleeve application on a mobile device. In other embodiments, the mobile device may automatically detect that the server sleeve is attached or a wireless connection is available with the server sleeve. In such an instance, the mobile device may automatically launch the server sleeve application, allowing the mobile device to connect with the server sleeve. At 310, the mobile device wirelessly, or through a physical connection, connects to the server sleeve. At 315, the server sleeve then proceeds to authenticate the mobile device.

Figure 4:
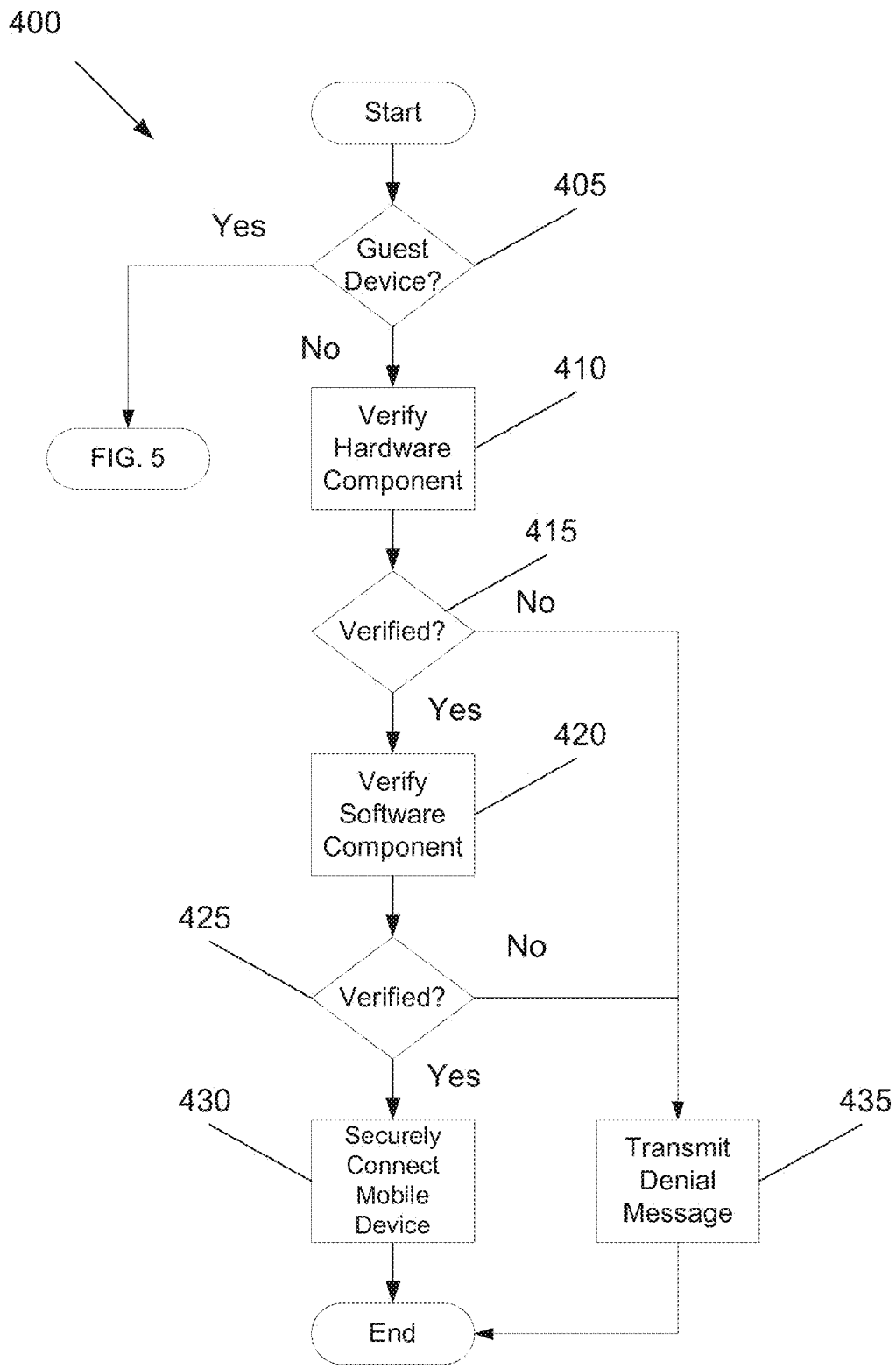
FIG. 4 is a flow diagram illustrating a process for authenticating a mobile device, according to an embodiment of the present invention.
Figure 5:
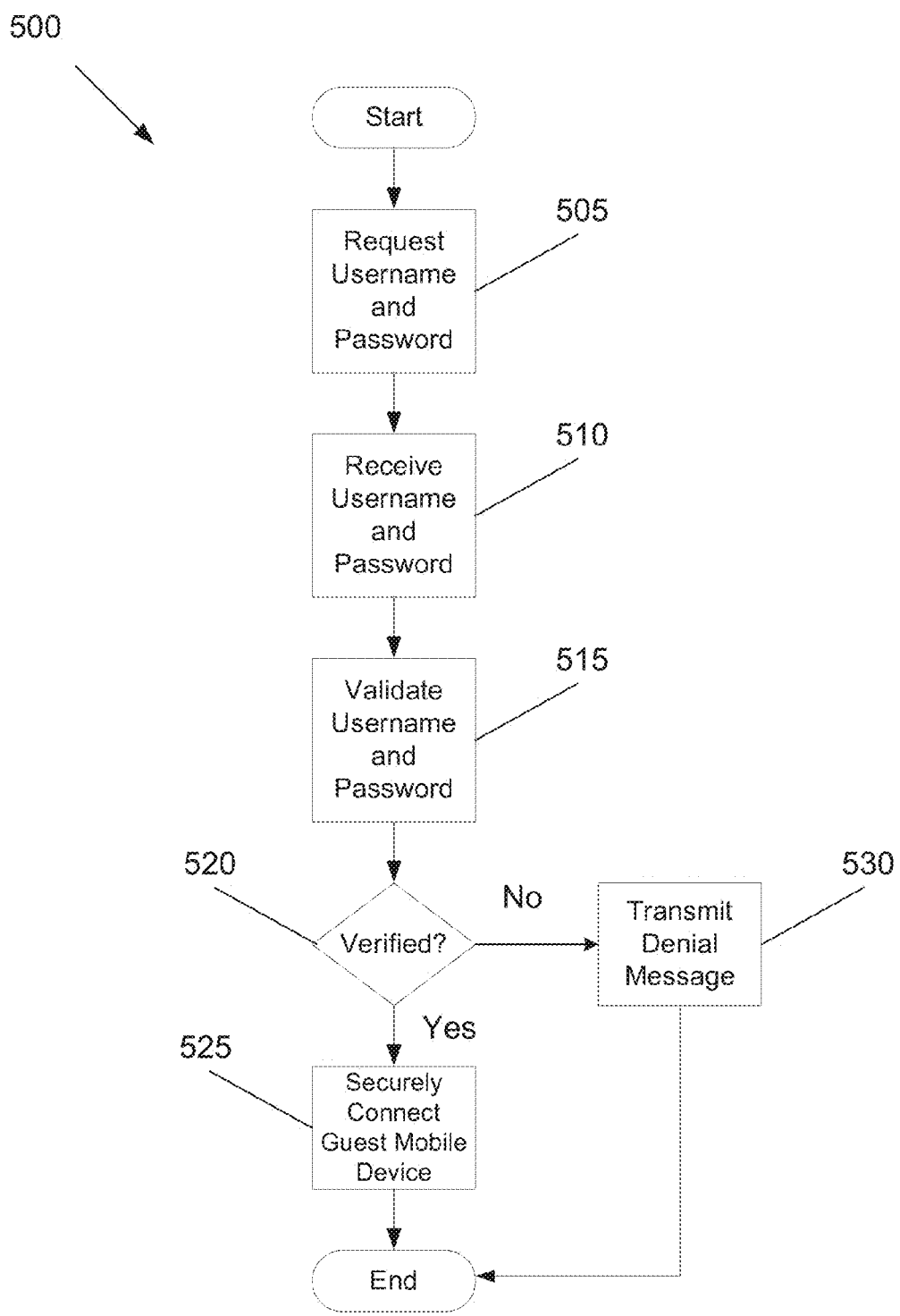
FIG. 5 is a flow diagram illustrating a process for authenticating a guest mobile device, according to an embodiment of the present invention.

FIG. 4 is a flow diagram 400 illustrating a process for authenticating a mobile device, according to an embodiment of the present invention. The process for authenticating in this embodiment may include attestation and remote attestation. The process begins at 405 with the server sleeve determining whether the mobile device is a guest device. If the mobile device is a guest device, the process proceeds to FIG. 5, which is a flow diagram 500 illustrating a process for authenticating (IAA—Identification, Authentication and Authorization) a guest mobile device, according to an embodiment of the present invention.

Assuming that the guest mobile device has a username and password, or some other form of authenticating (identification, authentication and authorization (IAAA)) information, the server sleeve requests for the guest mobile device to provide a username and password at 505. At 510, the server sleeve receives the username and password, and, at 515, attempts to validate the username and password. If the username and password cannot be validated at 520, then, at 530, an error (or denial) message is transmitted to the guest mobile device. However, if the username and password are validated at 520, then, at 525, the server sleeve securely connects to the guest mobile device and may launch a guest operating system stored on the server sleeve. This allows the guest mobile device to use a secure, trusted server. The process illustrated in FIG. 5 may be streamlined by implementing a single sign-on mechanism after the guest mobile device has been initially authenticated by the server sleeve.

Returning to FIG. 4, if the mobile device is not a guest device, the server sleeve at 410 verifies the hardware components of the server sleeve. At 415, the server sleeve determines whether the hardware components of the mobile device are verified. If the hardware components of the mobile device are not verified, the server sleeve transmits at 435 an error (or denial) message.

If the hardware components of the mobile device are verified, the server sleeve proceeds to verify at 420 the software components of the mobile device. At 425, the server sleeve determines whether the software components of the mobile device are verified. If the software components of the mobile device are not verified, the server sleeve transmits at 435 an error (or denial) message. If the software components of the mobile device are verified, the server sleeve securely connects to the mobile device at 430, providing a trusted, secure environment on the server sleeve. It should be appreciated that the process illustrated in FIG. 4 may be streamlined by implementing a single sign-on mechanism after the mobile device has been initially authenticated by the server sleeve.

FIG. 6 is a flow diagram 600 illustrating a process for updating one or more operating systems on a server sleeve, according to an embodiment of the present invention. The process begins with the server sleeve detecting at 605 that an update is available for one or more of the operating systems stored in the memory of the server sleeve. It should be appreciated that in certain embodiments the server sleeve may continuously search for updates while connected to the Internet via a satellite network or a mesh network to enable automatic synchronization of data. After an update is detected, at 610, the server sleeve downloads the update for the one or more operating systems, and, at 615, updates the one or more operating systems. The process of FIG. 6 may allow for validated updates to be applied, i.e., updates that are whitelisted.

It should be appreciated that this process not only applies to updating an operating system, but also applies to updating any firmware stored on the server sleeve. Such a process allows the mobile device to experience the most update-to-date operating system, as well as firmware, when the mobile device connects to the server sleeve.

FIG. 7 is a flow diagram 700 illustrating a process for creating a mesh network (to include MANET), according to an embodiment of the present invention. The process begins at 705 with the server sleeve detecting one or more other server sleeves proximate to the server sleeve. It should be appreciated that in certain embodiments, the server sleeve may continuously search for other proximate server sleeves. At 710, the server sleeve may wirelessly connect to the one or more other server sleeves. In some embodiments, the server sleeve may connect to the one or more other server sleeves using WIFI 220 shown in FIG. 2. At 715, the server sleeve, together with the one or more other server sleeves, form a mesh network providing constant communication with the Internet.

The steps shown in FIGS. 3-7 may be performed, in part, by a computer program, encoding instructions for a nonlinear adaptive processor to cause at least the processes described in FIGS. 3-7 to be performed by the apparatuses discussed herein. The computer program may be embodied on a non-transitory computer readable medium. The computer readable medium may be, but is not limited to, a hard disk drive, a flash device, a random access memory, a tape, or any other such medium used to store data. The computer program may include encoded instructions for controlling the nonlinear adaptive processor to implement the processes described in FIGS. 3-7, which may also be stored on the computer readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

Embodiments described herein pertain to a sleeve configured to attach to a mobile device. The sleeve includes a secure server configured to wirelessly connect to the mobile device.

It will be readily understood that the components of the invention, as generally described and illustrated in the figures herein, may be arranged and designed in a wide variety of different configurations. Thus, the detailed description of the embodiments is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
a mobile device case configured to attach to a mobile device, wherein
the mobile device case comprises a server configured to wirelessly connect to, and provide a secure and trusted environment for, the mobile device, and wherein the mobile device case uses a previously stored image comprising hardware and software of the mobile device to validate the mobile device through remote attestation, and create an encrypted virtual machine on the mobile device upon authentication, providing the secure and trusted environment with a root of trust.

2. The apparatus of claim 1, further comprising:
a crypto unit configured to validate an identity of the mobile device in order for the mobile device to connect to the server.

3. The apparatus of claim 2, wherein the crypto unit comprises:
a hardware encryption unit configured to validate hardware components of the mobile device.

4. The apparatus of claim 2, wherein the crypto unit further comprises:
a software encryption unit configured to validate the software components of the mobile device.

5. The apparatus of claim 1, further comprising:
memory comprising at least one virtual machine, wherein the at least one virtual machine, together with at least one processor, are configured to cause the server to launch at least one hosted operating system when the mobile device wirelessly connects to the server.

6. The apparatus of claim 1, further comprising:
a WIFI device configured to connect to at least one remote server to create a mesh network providing at least two mobile devices with network capabilities.

7. The apparatus of claim 1, further comprising:
a satellite communication unit configured to provide the server with constant connection to a network, Internet, or both.

8. The apparatus of claim 1, further comprising:
a rechargeable power supply configured to provide power to the apparatus, wherein
the rechargeable power supply is configured to switch to a low power consumption mode when the mobile device is not connected to the server.

9. The apparatus of claim 1, wherein the mobile device case comprises a display configured to display data to a user of the apparatus.

10. An apparatus, comprising:
a mobile device case, comprising:
a server configured to connect to a mobile device, and
a crypto-unit configured to authenticate hardware components and software components of the mobile device, wherein
the cypto-unit is further configured to utilize an image previously stored on the server of the mobile device case comprising hardware components and software components of the mobile device to validate the mobile device through remote attestation, and create an ancrypted virtual machine on the mobile device upon authentication, providing a secure and trusted environment with a root of trust.

11. The apparatus of claim 10, wherein the crypto-unit comprises:
a hardware encryption unit configured to validate hardware components of the mobile device.

12. The apparatus of claim 10, wherein the crypto-unit further comprises:
a software encryption unit configured to validate the software components of the mobile device.

13. The apparatus of claim 10, further comprising:
memory comprising at least one virtual machine, wherein the at least one virtual machine, together with at least one processor, are configured to cause the server to launch at least one hosted operating system when the mobile device wirelessly connects to the server.

14. The apparatus of claim 10, further comprising:
a WIFI device configured to connect to at least one remote server to create a mesh network providing at least two mobile devices with network capabilities.

15. The apparatus of claim 10, further comprising:
a satellite communication unit configured to provide the server with constant connection to a network, Internet, or both.

16. The apparatus of claim 10, wherein the server is configured to create a hot spot to provide a guest mobile device with access to a network.

17. The apparatus of claim 10, further comprising:
a rechargeable power supply configured to provide power to the apparatus, wherein
the rechargeable power supply is configured to switch to a low power consumption mode when the mobile device is not connected to the server.

18. A case for a mobile device, comprising:
memory; and
at least one processor configured to create a server configured to provide a secure, trusted environment for the mobile device,
wherein the case is further configured to use a previously stored image comprising hardware and software of the mobile device to validate the mobile device through remote attestation, and create an encrypted virtual machine on the mobile device upon authentication, providing a secure and trusted environment with a root of trust, and
the case is configured to physically attach to the mobile device.

19. The case of claim 18, further comprising:
a crypto unit configured to validate the mobile device when the mobile device attempts to connect to the server, wherein
the validation of the mobile device comprises attestation and remote attestation of the mobile device.

20. The case of claim 19, wherein the crypto-unit comprises:
a hardware encryption unit configured to validate hardware components of the mobile device.

21. The case of claim 19, wherein the crypto-unit comprises:
a software encryption unit configured to validate software components of the mobile device.

22. The case of claim 18, further comprising:
a software defined radio configured to connect to a number of communications protocols, providing the server with constant communication with the network.

23. The case of claim 22, further comprising:
a WIFI device configured to connect to at least one other mobile device case comprising a server to form a mesh network, allowing at least one other mobile device to connect to the mesh network.

24. The case of claim 22, further comprising:
a satellite communication unit configured to connect to a network via a satellite, providing the server with constant communication with the network.

25. An apparatus, comprising:
a mobile device case configured to attach to at least one mobile device, wherein
the mobile device case comprises a server configured to connect to, and provide a secure and trusted environment for, the at least one mobile device, and the mobile device case uses an image previously stored on the server of the mobile device case comprising hardware and software of the at least one mobile device to validate the at least one mobile device through remote attestation and creates an encrypted virtual machine on the mobile device upon authentication, providing the secure and trusted environment with a root of trust.

* * * * *